March 2, 1943.   T. H. RISK ET AL   2,312,360
MOTOR FUEL
Filed Dec. 15, 1939
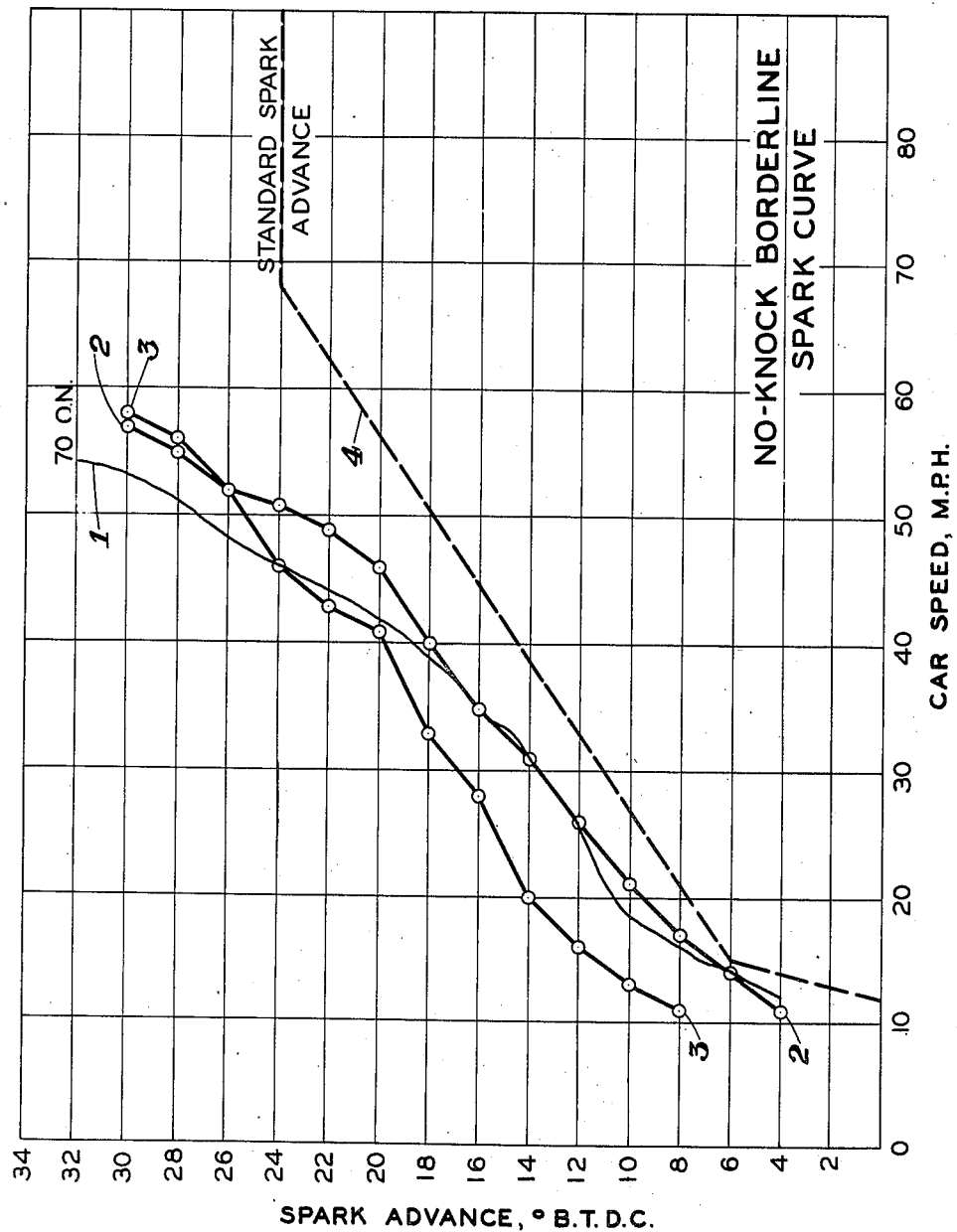
INVENTOR.
Thomas A. Risk.
Lawrence M. Henderson.
Austin B. Wilder.
BY Edward H. Jang
ATTORNEY.

UNITED STATES PATENT OFFICE 2,312,360

MOTOR FUEL

Thomas H. Risk, Highland Park, Lawrence M. Henderson, Winnetka, and Austin B. Wilder, Chicago, Ill., assignors to The Pure Oil Company, Chicago, Ill., a corporation of Ohio Application December 15, 1939, Serial No. 309,458

4 Claims. (Cl. 44—80)

This invention relates to motor fuels for internal combustion engines and particularly to automotive gasoline fuels having superior anti-knock characteristics.

It is well known that a motor fuel must be at least partially vaporized so as to form an air-vaporized fuel mixture before it can be satisfactorily burned in the combustion chamber of an internal combustion engine. It is thus apparent that volatility, which is the ability of a motor fuel to vaporize, is a most important property of a motor fuel. After an engine has been started and the operation continued for a sufficient period of time to warm up those portions of the engine that normally operate at elevated temperature, the air-fuel mixture which passes through the intake manifold to the combustion chamber will be found to have reached a substantial equilibrium composition and this composition will be maintained as long as the motor is operated at substantially constant speed and constant load. However, not all of the fuel is vaporized upon leaving the carburetor jet and passing into the intake manifold, some of the fuel remaining in the liquid phase, a substantial portion of which deposits on the walls of the manifold. During such periods of constant speed, for example, when operating a motor car on level ground at some uniform speed between 10 and 30 miles an hour, the velocity of the air-fuel mixture passing through the intake manifold is reasonably constant and the liquid fuel deposited on the walls of the intake manifold at the carburetor end reaches the engine cylinder at about the same rate as it is supplied by the carburetor, that is, under these conditions, the air-fuel ratio supplied to the cylinders, most nearly approximates the air-fuel ratio supplied by the carburetor at the fuel inlet end of the manifold. However, when the speed is increased there is a period immediately after the throttle has been opened, during which the amount of fuel actually delivered to the cylinders is considerably less than that passing from the carburetor into the inlet end of the manifold. The vaporized portion of the increased amount of fuel passing to the manifold due to the opening of the throttle, reaches the cylinder in the form of an air-fuel vapor mixture very quickly, but a substantial portion of the non-vaporized portion of the increased amount of fuel passing to the manifold, flows along the walls of the intake manifold and moves much more slowly, thus not reaching the cylinder until an appreciable time after the increased amount of air-vaporized fuel mixture. This effect is further aggravated by the inertia of the liquid fuel since the forward acceleration of the car tends to force liquid fuel to the rear section of the manifold.

Due to this lag in fuel actually reaching the cylinders during the period immediately after the throttle opening is increased, the cylinders receive all the air passing through the carburetor and all the vaporized fuel, but only that part of the liquid fuel which is being distributed along the walls of the manifold prior to the time the throttle opening is increased. While the manufacturers of modern carburetors have equipped the carburetors with special devices that provide for an extra charge of fuel to be injected into the intake manifold immediately upon the opening of the throttle, yet lean mixtures of air and fuel reaching the cylinders during periods of acceleration, particularly in the lower speed ranges, are still evident, as indicated particularly by the tendency to knock more than does a normal or correct air-fuel mixture. The term "knock" is used to designate the sharp ringing noise produced supposedly by a wave of high pressure gas, set up by the explosion of air-fuel mixture in the combustion chamber, striking the inner side of the combustion chamber walls. It has been proved by numerous investigators and is now generally accepted that fuels that cause knocking in internal combustion engines of the spark ignition type, produce less efficient operation than those fuels that do not knock or knock to a lesser degree. The tendency to have lean air-fuel mixtures immediately after opening the throttle to accelerate an engine is not so clearly evident at higher speeds of operation since at higher speeds the air flow through the intake manifold is at a much higher rate and part of the liquid fuel reaches the cylinders in the form of a mist suspended in the air-vaporized fuel mixture and travels to the cylinders as rapidly as the increased vapor mixture.

It is an object of this invention to provide motor fuels having greatly improved performance characteristics.

It is another object of this invention provide improved motor fuels having high anti-knock characteristics.

It is still another object of this invention to provide improved motor fuels which exhibit superior performance characteristics in internal combustion engines during periods of acceleration at low speeds.

It is a further object of this invention to provide improved motor fuels containing an increased proportion of low boiling, high octane components.

These and other objects of the invention will be apparent from the following detailed description considered in connection with the accompanying drawing, the single figure of which is a graph.

It has been found as a result of extensive tests in actual motor car operation that the modern automobile engine has the greatest tendency to knock when under conditions of rapid acceleration in the speed range of approximately 10 to 30 miles per hour. The exact speed range of greatest knocking tendency may vary considerably due to the particular gear arrangement employed but, in general, occurs at engine speeds of approximately 700 to 2000 R. P. M. Under these conditions of operation the air-fuel mixture supplied to the combustion chamber is in general a leaner mixture and contains a much higher proportion of the more volatile components of the gasoline than that normally supplied to the combustion chambers. It is, therefore, necessary that the more volatile components of the fuel, which form a much higher proportionate part of the fuel actually burned during periods of acceleration from low speeds, have a higher anti-knock value than that required of the completely vaporized fuel if knocking is to be prevented during the critical period of acceleration through the range of relatively low speeds.

It has now been found that vastly improved operations in internal combustion engines may be obtained by incorporating into the fuel used certain specific compounds possessing high volatility, high anti-knock value and high anti-knock blending value. Highly volatile compounds within the scope of this invention are those compounds which boil within the range of approximately 100° F. and 140° F. and similarly, high anti-knock compounds are those compounds which have an A. S. T. M. motor method octane blending value not substantially less than 110. The boiling points and octane blending values of a number of such compounds are shown in Table I:

TABLE I

|  | Boiling point | A. S. T. M. octane blending value |
|---|---|---|
|  | °F. |  |
| 2,3 dimethyl butane | 136 | [1] 124 |
| cyclopentane | 121 | 116 |
| cyclopentene | 113 | 118 |
| 2 pentene | 97 | 107 |
| 4 methyl pentene-2 | 138 | 115 |
| trimethyl ethylene | 101 | 122 |

[1] Research method.

Broadly speaking, the more volatile hydrocarbons of those hydrocarbons normally occurring in commercial motor fuels have greater anti-knock values than the less volatile. A closer examination, however, reveals that this broad generalization is often not true. For example, normal hexane, boiling at 156° F., has an anti-knock value of 59 as compared with iso-octane (2,2,4-trimethyl pentane) which boils at 210° F. and has an anti-knock value of 100. While it may have already been recognized that some or all of the compounds shown in Table I as well as other hydrocarbons which possess inherently high octane ratings are useful motor fuel additives, it has not been recognized that the addition of compounds having boiling points within a critical boiling range and high anti-knock blending values, to motor fuels, particularly motor fuels of relatively low anti-knock value, produces a tremendous improvement in the fuel as indicated by greatly improved operating efficiency of the internal combustion engines in which such fuel is used even though there is no substantial increase in the over-all knock rating of the fuel.

In the course of studying the relation of motor fuel composition to motor performance, it was noted that all of the commercial motor fuels tested contained a very small portion of constituents having a true boiling point within the approximate range of 100° F. to 140° F. This deficiency of constituents boiling in this range was not noticeable in the usual A. S. T. M. distillation data since the fractionation obtained in distilling motor fuel by this method is insufficient to separate constituents of relatively widely different boiling ranges. In order to obtain adequate fractionation for separation of motor fuels into various components in accordance with the true boiling points of the components, a packed column was used in which provisions were made for carefully controlling the ratio of reflux to distillate. The conspicuous difference between the proportion of hydrocarbons boiling between approximately 100° F. and 140° F. and the proportion of hydrocarbons boiling between other temperature ranges of similar magnitude as shown in true boiling point distillations, as well as the difference between the proportion of hydrocarbons boiling between approximately 100° F. and 140° F. as shown by true boiling point distillations and A. S. T. M. distillations, is shown in Tables II and III.

TABLE II

Fuel 1

| Cut No. | Temp. tower top | Yield |
|---|---|---|
|  | °F. | Percent |
| I. B. P | 68 |  |
| 1 | 103 | 17.5 |
| 2 | 119 | 2.2 |
| 3 | 140 | 2.5 |
| 4 | 159 | 10.0 |
| 5 | 178 | 5.0 |
| 6 | 209 | 12.5 |
| 7 | 250 | 14.0 |
| 8 | 298 | 13.8 |
| 9 | 330 | 10.0 |
| 10 |  | 12.5 |

Fuel 2

| Cut No. | Temp. tower top | Yield |
|---|---|---|
|  | °F. | Percent |
| I. B. P | 74 |  |
| 1 | 102 | 18.8 |
| 2 | 120 | 3.1 |
| 3 | 139 | 1.3 |
| 4 | 159 | 7.5 |
| 5 | 180 | 4.3 |
| 6 | 210 | 13.8 |
| 7 | 250 | 16.2 |
| 8 | 293 | 13.8 |
| 9 | 330 | 10.0 |
| 10 |  | 11.2 |

Fuel 3

| Cut No. | Temp. tower top | Yield |
|---|---|---|
|  | °F. | Percent |
| I. B. P | 63 |  |
| 1 | 105 | 13.8 |
| 2 | 118 | 1.2 |
| 3 | 139 | 1.3 |
| 4 | 160 | 8.8 |
| 5 | 178 | 4.4 |
| 6 | 209 | 12.5 |
| 7 | 250 | 13.7 |
| 8 | 294 | 16.2 |
| 9 | 330 | 14.4 |
| 10 |  | 13.7 |

Fuel 4

| Cut No. | Temp. tower top | Yield |
|---|---|---|
| | °F. | Percent |
| I. B. P | 68 | |
| 1 | 103 | 15.0 |
| 2 | 120 | 1.0 |
| 3 | 139 | 1.3 |
| 4 | 160 | 8.7 |
| 5 | 178 | 4.4 |
| 6 | 208 | 12.5 |
| 7 | 249 | 12.5 |
| 8 | 294 | 15.6 |
| 9 | 330 | 11.3 |
| 10 | | 17.7 |

Fuel 5

| Cut No. | Temp. tower top | Yield |
|---|---|---|
| | °F. | Percent |
| I. B. P | 74 | |
| 1 | 103 | 17.5 |
| 2 | 120 | 1.0 |
| 3 | 140 | 2.5 |
| 4 | 160 | 7.8 |
| 5 | 181 | 4.4 |
| 6 | 209 | 11.2 |
| 7 | 250 | 13.8 |
| 8 | 294 | 15.0 |
| 9 | 330 | 13.7 |
| 10 | | 13.1 |

Fuel 6

| Cut No. | Temp. tower top | Yield |
|---|---|---|
| | °F. | Percent |
| I. B. P | 72 | |
| 1 | 102 | 17.5 |
| 2 | 122 | 2.5 |
| 3 | 140 | 1.3 |
| 4 | 160 | 8.7 |
| 5 | 179 | 3.8 |
| 6 | 209 | 11.2 |
| 7 | 250 | 15.0 |
| 8 | 292 | 16.3 |
| 9 | 330 | 11.9 |
| 10 | | 11.8 |

Fuel 7

| Cut No. | Temp. tower top | Yield |
|---|---|---|
| | °F. | Percent |
| I. B. P | 66 | |
| 1 | 103 | 15.0 |
| 2 | 120 | 0.6 |
| 3 | 140 | 2.5 |
| 4 | 160 | 7.5 |
| 5 | 179 | 7.5 |
| 6 | 210 | 13.7 |
| 7 | 250 | 13.8 |
| 8 | 293 | 13.8 |
| 9 | 330 | 12.5 |
| 10 | | 13.1 |

The data in Table II were secured by testing seven of the most widely distributed competitive commercial motor fuels of the so-called "regular" quality. Large samples, about ten gallons in volume, of the fuels were separated into ten fractions by means of distillation through the aforementioned packed column using a high reflux ratio. In this manner it was possible to accurately determine the proportion of components boiling between any given temperatures within the range of the indicated tower temperatures. It may be readily seen in Table II that the proportion of components in these fuels which boil between approximately 100° F. and 140° F. is much less than that which boils in any other range of similar temperature differential. For example, fuel 4 which is perhaps the most widely commercially distributed of any of the fuels tested, has only 2.9% of material boiling between 100° F. and 140° F., whereas the next lowest amount of material boiling in a range of 40° F. is 13.5% in the range 140° F. to 180° F., or over four times the amount which boils between 100° F. and 140° F.

TABLE III

| Fuel number | 100° F. to 140° F. A. S. T. M. | 100° F. to 140° F. T. B. P. |
|---|---|---|
| | Per cent | Per cent |
| 1 | 9.2 | 5.2 |
| 2 | 11.8 | 5.1 |
| 3 | 8.8 | 3.4 |
| 4 | 9.1 | 2.9 |
| 5 | 10.2 | 3.8 |
| 6 | 11.1 | 4.1 |
| 7 | 9.3 | 3.3 |
| Average | 9.93 | 3.97 |

An inspection of the data in Table III shows that this deficiency in commercial motor fuels of materials which boil between 100° F. and 140° F. is not revealed by A. S. T. M. distillation. These data were obtained by interpolating the true boiling point distillation data shown in Table II and data obtained from separate A. S. T. M. distillations of the same motor fuels. Again referring to fuel 4, it may be seen that while the A. S. T. M. distillation indicated that 9.1% of the fuel boiled between 100° F. and 140° F., the true boiling point data reveals that there is actually only 2.9% which boils in this range. Since it has been found that materials which boil in the range of approximately 100° F. to 140° F. have a marked effect on engine operation, particularly in relatively low speed ranges and under conditions of acceleration, volatilize readily in an engine manifold and yet have vapor pressures below the point which would cause vapor-locking troubles with the fuels in which they are blended, it is apparent that more evenly balanced and improved volatility characteristics of motor fuels may be effected by adding materials which increase the proportion of components boiling within this critical boiling range.

The improvement in performance effected by the addition of the preferred materials to motor fuels cannot be indicated by the usual octane rating determination due to deficiencies inherent in the available recognized methods of testing. Many methods and a rather large number of devices have been proposed for the evaluation of motor fuels by knocking tendencies. Probably the best known testing devices are the Ricardo variable compression engine, the Ethyl Gasoline series 30 engine and the Cooperative Fuel Research engine, usually called C. F. R. The C. F. R. engine is undoubtedly in more general use today than any other engine for antiknock testing purposes. The most widely used method of determining knocking tendency with the C. F. R. engine is one which has been standardized and recommended by the American Society for Testing Materials. This is known as the A. S. T. M. motor method. Results of tests by the A. S. T. M. motor method using the C. F. R. engine are reported in terms of octane numbers. Octane number of a motor fuel is numerically equivalent to the percent by volume of iso-octane (2, 2, 4 trimethyl pentane) in n-heptane that is equal in knocking tendency to the fuel under test, the better fuels having the higher numerical values. In considering the effectiveness of various additives to motor fuels for improving octane number, it has been found convenient to refer to this effectiveness in terms of "blending octane number" or "octane blending value." These terms are used to designate the behavior of a motor fuel additive in raising the octane number of a reference fuel and may be defined as the effective octane number of an additive when dissolved in approximately 60 A. S. T. M. motor method octane rating, substantially saturated, reference motor fuel in amount of approximately 20% by volume. In general, the blending octane number of olefin hydrocarbon is higher, and that of aromatic hydrocarbons lower, than the actual octane number of the hydrocarbon.

However, from the inception of the method of testing motor fuels by measurement of knocking tendency there has been and still is a considerable discrepancy between the rating of fuels as determined by the various testing methods. Furthermore, and of probably still greater importance, is the fact that there still prevails a probably greater discrepancy between the ratings of motor fuels as determined by any of the foregoing methods and the rating of motor fuels as determined by actual road performance tests. One prominent factor—if not the most prominent factor—that contributes to the latter discrepancy is the fact that the prevailing testing methods require the operation of the testing engines at constant speed and under constant loads, whereas the knocking tendency of automotive engines in actual operation, as previously pointed out, is greatest during periods of acceleration, particularly within the lower speed ranges. It is apparent, therefore, that the unusual and unexpected improvement in motor fuels accomplished by additives within the scope of this invention cannot be demonstrated by the usual anti-knock testing methods. The only satisfactory method known at the present time is a much more time-consuming and expensive test of the fuels by testing the fuels in engines under conditions of actual road performance. These tests are called "road rating tests." The additional time and expense involved is justified by the fact that the results of such tests are final and conclusive as to the value of a motor fuel in actual service.

The road rating test consists of the evaluation of motor fuel by means of determining the knocking tendency of standard automobile engines when using the fuel under test, under conditions of actual performance on the road. Since it is generally accepted that knocking is an indication of inefficient operation, those fuels that show the least tendency to knock are the superior fuels. Through the use of proper instruments the highest spark advance attainable without evidence of knock at a given speed is determined. This test is repeated for a number of different speeds. By plotting the highest spark advance attainable without evidence of knocking against car speed in miles per hour, a curve is obtained which when compared with a curve showing the standard spark advance setting of the engine in which the tests are being made, indicates whether or not a given fuel may be expected to knock in that particular car when operated with the standard spark advance setting. The results of such tests have been plotted in the figure forming a part of this specification. Curve #4 shows the standard spark advance setting for the car used in the tests which was a well known and widely distributed standard car that had been driven approximately 15,000 miles. Curve #1 shows the data obtained when testing fuel 1, a 70 octane substantially saturated fuel, on this car. Curve #2 represents the results obtained when using fuel 2, a high grade commercial motor fuel of 72 octane rating and containing tetraethyl lead. Curve #3 represents the results obtained on fuel 3, a fuel which was prepared by fractionally distilling fuel 1 and removing a fraction representing the lowest boiling 10% of the fuel and substituting therefor approximately 10% of trimethyl ethylene. This substitution of about 10% of trimethyl ethylene in fuel 1 actually decreased the volatility of the gasoline, as shown by the A. S. T. M. distillation of fuels 1 and 3, and according to the commonly accepted conception of the relation of volatility and knock rating, would be expected to show poorer performance characteristics. The A. S. T. M. knock rating remained the same. This is clearly shown in Table IV:

TABLE IV

|  | Fuel 1 | Fuel 2 | Fuel 3 |
|---|---|---|---|
| A. S. T. M. octane number, M. M. | 70.0 | 72.0 | 70.0 |
| Initial boiling point | 122 | 87 | 137 |
| 5% | 153 | 108 | 160 |
| 10% | 161 | 121 | 168 |
| 20% | 173 | 144 | 180 |
| 30% | 188 | 168 | 192 |
| 40% | 197 | 192 | 202 |
| 50% | 205 | 221 | 210 |
| 60% | 214 | 246 | 224 |
| 70% | 224 | 271 | 239 |
| 80% | 239 | 301 | 258 |
| 90% | 279 | 338 | 297 |
| 95% | 310 | 376 | 335 |
| E. P. | 359 | 386 | 371 |
| Percent rec | 98.6 | 96.3 | 98.0 |
| Percent res | 0.8 | 1.3 | 1.1 |
| Percent loss | 0.6 | 2.4 | 0.9 |

The addition of the trimethyl ethylene improved the road rating value of the fuel a tremendous amount as evidenced by the fact that at 15 miles per hour, the speed at which all of the fuels showed the greatest tendency to knock, as evidenced by the proximity to the standard spark advance curve #4, an increase of only one degree in spark advance above the standard setting would cause knocking on fuel 1, a 70 octane number motor fuel, whereas at the same speed on fuel 3, a fuel of the same octane number but which contained about 10% of trimethyl ethylene, the spark could be advanced over five degrees before knocking would occur. It is also apparent that the road rating of the blended fuel 3 is much superior to that obtained by an even higher octane rating commercial motor fuel indicated by curve #2. It has been found that an unusually great improvement in road rating and road performance of motor fuels can be obtained by the addition of low boiling materials, boiling within the approximate range of 100° F. to 140° F. and possesing a high octane blending value, that is, a blending value not substantially less than 110 A. S. T. M. motor method.

In general it is preferable to use olefin type hydrocarbons since these hydrocarbons usually possess higher octane blending values than actual octane number and in addition possess superior combustion characteristics. Metallo-organic compounds may be used but these compounds generally leave undesirable deposits on those parts of the engine exposed to the combustion gases and are therefore less desirable. The proportion of such added material that has been found most effective is in the range of approximately 5% to 25% by volume of the fuel. The additive materials may be used either instead of or in conjunction with other fuel improving agents such as, for example, lead tetraethyl. The benficial effect of the preferred additives is particularly conspcuous when added to motor fuels containing no, or only a relatively small proportion of, unsaturated hydrocarbons.

By thus improving the anti-knock quality of that portion of the motor fuel which critically affects engine performance and which boils between approximately 100° F. and 140° F. it is possible to obtain greatly improved engine performance from motor fuels whose over-all octane number, as indicated by any of the various methods of test, remains the same. Furthermore, by choosing high anti-knock additives which boil within a boiling range in which the ordinary motor fuel is deficient, a combined effect of improved knock rating and more evenly balanced volatility produces an unexpectedly great improvement in the actual performance of internal combustion engines in which such fuels are used. While in one of the particular examples given the lightest 10% of the gasoline was stripped out and trimethyl ethylene substituted therefor, it is not necessary that this stripping operation be done. Excellent results may be accomplished by simply adding a suitable proportion of trimethyl ethylene to the motor fuel.

Although the invention has been described in connection with specific details of certain embodiments thereof, it is not intended that such details shall be considered as limiting the scope of the invention except insofar as included in the following claims.

It is claimed:

1. An improved hydrocarbon motor fuel comprising a base stock consisting substantially of saturated hydrocarbons boiling above 140° F. but within the gasoline range, and between approximately 5% and 25% by volume of addition agent, said agent consisting of olefinic hydrocarbons boiling within the approximate range of 100° F. to 140° F. and having an octane blending value of not substantially less than 110, the octane number of the base stock being such that an amount of addition agent within the aforementioned limits will produce a final motor fuel of not less than approximately 70 octane number.

2. Motor fuel in accordance with claim 1 in which the addition agent is trimethyl ethylene.

3. An improved hydrocarbon motor fuel comprising a base stock consisting substantially of saturated hydrocarbons boiling within the gasoline boiling range and containing not more than approximately 5% by volume of hydrocarbons boiling within the range of 100° F. to 140° F., to which has been added 5 to 25% by volume of olefinic hydrocarbons boiling within the range of 100° to 140° F. and having an octane blending value of not substantially less than 110, the octane number of the base stock being such that the resulting motor fuel has an octane number of not less than 70.

4. Motor fuel in accordance with claim 3 in which the addition agent is trimethyl ethylene.

THOMAS H. RISK.
LAWRENCE M. HENDERSON.
AUSTIN B. WILDER.